(12) United States Patent
Zhu et al.

(10) Patent No.: US 10,300,347 B2
(45) Date of Patent: May 28, 2019

(54) SEALED PRESSURE CONTAINER (71) Applicants: Albert Y. Zhu, Poughkeepsie, NY (US); Brian Y. Zhu, Poughkeepsie, NY (US); Huilong Zhu, Poughkeepsie, NY (US)

(72) Inventors: Albert Y. Zhu, Poughkeepsie, NY (US); Brian Y. Zhu, Poughkeepsie, NY (US); Huilong Zhu, Poughkeepsie, NY (US)

(*) Notice: Subject to any disclaimer, the term of this patent is extended or adjusted under 35 U.S.C. 154(b) by 204 days.

(21) Appl. No.: 15/530,608

(22) Filed: Feb. 6, 2017

(65) Prior Publication Data
US 2018/0221718 A1    Aug. 9, 2018

(51) Int. Cl.
G01L 7/02      (2006.01)
A63B 39/02     (2006.01)
A63B 47/00     (2006.01)
B65D 81/20     (2006.01)
A63B 102/02    (2015.01)

(52) U.S. Cl.
CPC ............ *A63B 47/00* (2013.01); *A63B 39/025* (2013.01); *B65D 81/20* (2013.01); *G01L 7/026* (2013.01); *A63B 2102/02* (2015.10)

(58) Field of Classification Search
CPC ..... A63B 47/00; A63B 39/02; A63B 2102/02; G01L 19/16; G01L 7/026; B65D 81/20
USPC ..... 206/315.9, 459.1; 383/88, 89, 90, 56, 68
See application file for complete search history.

(56) References Cited

U.S. PATENT DOCUMENTS

| 1,898,171 | A | * | 2/1933  | Bunnell   | A45C 11/22    |
|           |   |   |         |           | 224/673       |
| 2,854,717 | A | * | 10/1958 | O'Farrell | B65D 77/14    |
|           |   |   |         |           | 24/30.5 R     |
| 3,042,796 | A | * | 7/1962  | De Forest | F21L 4/005    |
|           |   |   |         |           | 206/525       |
| 3,066,846 | A | * | 12/1962 | Domigan   | B65D 77/14    |
|           |   |   |         |           | 24/298        |
| 3,208,587 | A | * | 9/1965  | Lizio     | B65D 81/00    |
|           |   |   |         |           | 206/440       |
| 3,602,221 | A | * | 8/1971  | Bleicken  | B63C 11/325   |
|           |   |   |         |           | 128/205.26    |
| 4,019,629 | A | * | 4/1977  | Dubner    | A63B 39/025   |
|           |   |   |         |           | 137/857       |
| 4,184,596 | A | * | 1/1980  | Avery     | B65D 81/075   |
|           |   |   |         |           | 206/522       |
| 4,414,717 | A | * | 11/1983 | Payne     | B65D 33/1658  |
|           |   |   |         |           | 24/30.5 R     |

(Continued)

*Primary Examiner* — Jacob K Ackun
*Assistant Examiner* — Jenine Pagan (57) ABSTRACT

The disclosure relates to a sealed pressure container, which solves the problem in the prior art that a pump is required for providing air pressure in the container. The conventional product is inconvenient for carrying and is expensive. The sealed pressure container includes a body and a winding member. The body has an open end and a flexible portion, the flexible portion is at least one part of the body at one side where the open end is formed. The flexible portion can be wound around the winding member from the open end to provide air pressure in the body by compressing the air inside the body. Thus, without using a pump, tennis balls can be prevented from releasing pressure by keeping in the low-cost sealed pressure container. The sealed pressure container is convenient for carrying and operating and has reduced manufacture cost.

10 Claims, 8 Drawing Sheets

(56) References Cited

U.S. PATENT DOCUMENTS

| | | | | |
|---|---|---|---|---|
| 4,729,472 A | * | 3/1988 | Lubin | A63B 47/00 |
| | | | | 206/315.9 |
| 4,997,104 A | * | 3/1991 | Pohl | B65D 33/1666 |
| | | | | 229/117.34 |
| 5,044,495 A | * | 9/1991 | Wyslotsky | B65D 81/2061 |
| | | | | 206/315.9 |
| 5,347,671 A | * | 9/1994 | Hunts | B65D 33/1675 |
| | | | | 24/30.5 R |
| 5,983,460 A | * | 11/1999 | Hyde | B65D 33/1666 |
| | | | | 24/30.5 R |
| 7,503,696 B2 | * | 3/2009 | Ha | B65D 33/007 |
| | | | | 24/30.5 R |
| 9,078,502 B2 | * | 7/2015 | Fily | A45C 13/14 |

* cited by examiner

SEALED PRESSURE CONTAINER

BACKGROUND OF THE INVENTION

Field of the Invention

The disclosure relates to a container for maintain pressure, in particular to a sealed pressure container for maintaining pressure for tennis balls.

Description of the Related Art

Tennis is a very popular sport in the world. In accordance with international standards, a tennis ball should be able to bounce up to a certain height after falling down to a hard ground from a certain height. Currently, hollow tennis balls are used in vast majority of trainings and competitions. The hollow tennis balls are generally composed of a hollow rubble ball and a layer of felt pasted on the outside surface of the rubber ball. Filled with a certain amount of gas, the absolute internal pressure inside the hollow tennis should be 1.841 bar, which is higher than the natural atmospheric pressure, in order to meet the requirements of the bounce height. As the rubber itself is a type of microporous material which is not completely dense, the hollow tennis ball (hereinafter referred to as tennis ball) will slowly leak through the rubber layer under the natural atmospheric pressure, leading to the reduction of the internal pressure, thereby weakening the bounce performance. Therefore, the tennis ball in the market is generally packaged in metal or plastic pressure tank in order to maintain its internal pressure and elasticity. However, once the tank is opened, because the internal pressure of the tennis ball is higher than ambient pressure and the tennis ball is continuously beat by the ball racket, the internal pressure of the tennis ball will gradually reduce so that the bounce performance of the ball will quickly decrease, thus reducing the service time of the tennis ball which leads to a serious waste. The discarded tennis balls also cause damage to the environment.

The following method is used to maintain the stability of the bounce performance, and prolong the service life of the tennis balls. Used tennis balls are put in an airtight pressure container, and then a sealed cap is used to seal the port of the pressure container through an ordinary thread connection or a snap connection. Then a pump is used to inflate the container for increasing the internal pressure which is indicated by a pressure gauge. When the internal pressure of the container is higher than the internal pressure of the tennis ball by a predetermined value, stop inflating the container. By this method, the tennis ball is prevented from releasing pressure. At the same time, the tennis ball is inflated for compensating the internal pressure loss during use. When a tennis ball is needed, access the tennis ball by removing the sealing cover after releasing the internal pressure of the container through the exhaust valve.

There are following problems according to the above method. A high-cost pump is required to cooperate with the pressure tank, which is inconvenient to carry. Moreover, the operation is complex.

BRIEF DESCRIPTION OF THE INVENTION

In view of this, the disclosure provides a low-cost sealed pressure container which is convenient to carry and easy to operate.

For this purpose, the disclosure provides technical solutions as follows.

A sealed pressure container is provided, comprising
a body having an opening and a flexible portion at least at one side where the open end is formed;
a winding member;
wherein the flexible portion of the body can be wound around the winding member from the open end of the body to compress the air in the body and provide air pressure in the body.

Preferably, the sealed pressure container includes a securing member for securing a first portion of the body that has been wound.

Preferably, the securing member includes a fastener for securing the winding portion and non-winding of the body.

Preferably, the fastener includes a buckle tape, a first buckle member and a second buckle member;
one end of the buckle tape is secured on the body, and the other end of the buckle tape has the first buckle member;
the second buckle member is secured on the body;
and the first buckle member and the second buckle member are adhered to each other after the buckle tape is wound successively around the first portion and the second portion of the body.

Preferably, the sealed pressure container further comprises a pressure gauge for indicating the pressure in the body.

Preferably, the sealed pressure container further comprises:
at least one rigid handle having a scale for indicating the pressure in the body;
a flexible arm having one end being connected with the rigid handle and the other end being connected with the winding member;
a pointer having one end being connected with the winding member and the other end being pointing the scale of the rigid handle.

Preferably, the rigid handle has an annular shape and surrounds the winding member.

Preferably, the sealed pressure container comprises two rigid handles which are respectively arranged on two ends of the winding member.

Preferably, the securing member comprises a fastener for securing the winding portion and non-winding of the body.
the fastener comprises a buckle tape, a first buckle member, a second buckle member, a third buckle member and a fourth buckle member;
one end of the buckle tape is secured on the body, and the other end of the buckle tape has the first buckle member;
the second buckle member is secured on the body;
the third buckle member is secured on the rigid handle;
the fourth buckle member is provided on the buckle tape, opposite to the location of the third buckle member;
the first buckle member and the second buckle member are adhered to each other and the fourth buckle member and third buckle member are adhered to each other after the buckle tape is wound successively around the non-winding and winding portions of the body.

Preferably, a sealing member is provided on the open end of the body for opening or closing the open end.

Preferably, the winding member is detachably connected to the body.

Preferably, a connection portion protrudes from one side of the open end of the body and the winding member is detachably provided on the connection portion;
or, the winding member has a through hole, and the open end of the body extends through the through hole.

Preferably, the winding member comprises a first section and the second section on the end of the first section, the first section has a through hole, and one end of the through hole extends to the side surface of the first section.

The disclosure has the following beneficial effects.

The sealed pressure container according to the disclosure includes a winding member and a body with an opening.

The flexible portion of the body is wound around the winding member from the open end of the body, after the articles, which requires to be kept under pressure, such as tennis balls, are put into the body through the open end. Thus the internal air of the body is compressed to provide air pressure, preventing the articles from releasing pressure, with no need for a pump. The sealed pressure container is easily to carry, operate and with low cost.

BRIEF DESCRIPTION OF THE DRAWINGS

The above and other objects, advantages and features of the present invention will become more fully understood from the detailed description given herein below in connection with the appended drawings, and wherein.

1. body, 11. connection portion, 2. winding member, 21. through hole, 22. first section, 23. second section, 24. bump, 25. jack, 31. buckle tape, 32. first buckle member, 33. second buckle member, 34. third buckle member, 35. fourth buckle member, 4. rigid handle, 5. flexible arm, 6. pointer, 8. sealing strip, 9. fastener, 10. tennis ball.

DETAILED DESCRIPTION OF EMBODIMENTS OF THE INVENTION

Reference will now be made in detail to particular embodiments of the disclosure, it will be understood that the scope of the present invention is not limited to these embodiments. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, processes and components have not been described in detail so as not to unnecessarily obscure aspects of the present invention.

The disclosure provides a sealed pressure container, which includes a winding member and a body. The body has an open end and a flexible portion, the flexible portion is at least one part of the body on the same side with the open end. The flexible portion of the body can be wound around the winding member from the open end to compress the air inside the body for providing air pressure in the body. Thus, without using a pump, tennis balls can be prevented from releasing pressure by keeping in the low-cost sealed pressure container, which is easy to carry and operate.

The embodiments of the sealed pressure container are described in detail as follows by reference to FIGS. 1 to 15.

First Embodiment

There is provided a sealed pressure container as shown in FIGS. 1 to 6, which includes a body 1 and a winding member 2. In the present embodiment, the body 1 is a cylinder which can facilitate the storage of the tennis balls 10. However, the body 1 may be other kind of shapes.

Figure 1:
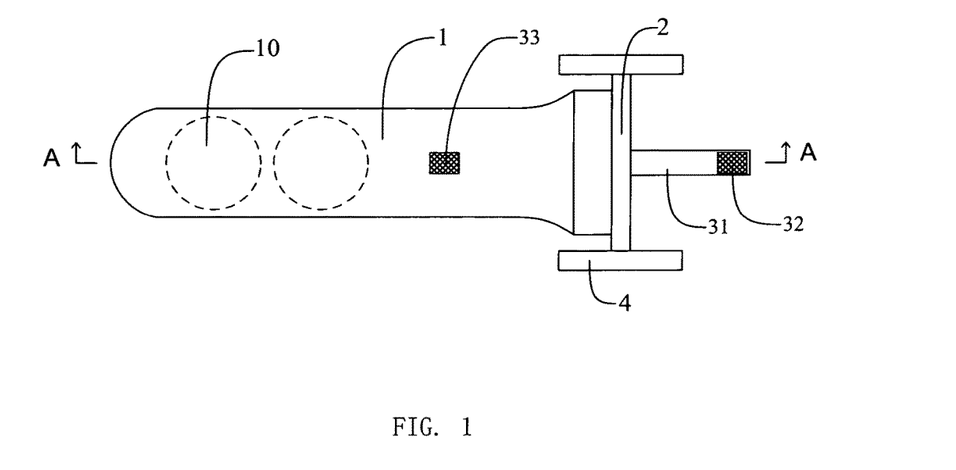
FIG. 1 is a plan view of the sealed pressure container without having been wound according a first embodiment.

The body has an opening at one end, and the tennis balls 10 can be put into the body 1 through the open end. For the purpose of wounding, the body 1 is flexible at least at the same end with the open end. It is preferable that the whole body 1 is flexible, for example, the body 1 is a storage bag.

Figure 4:
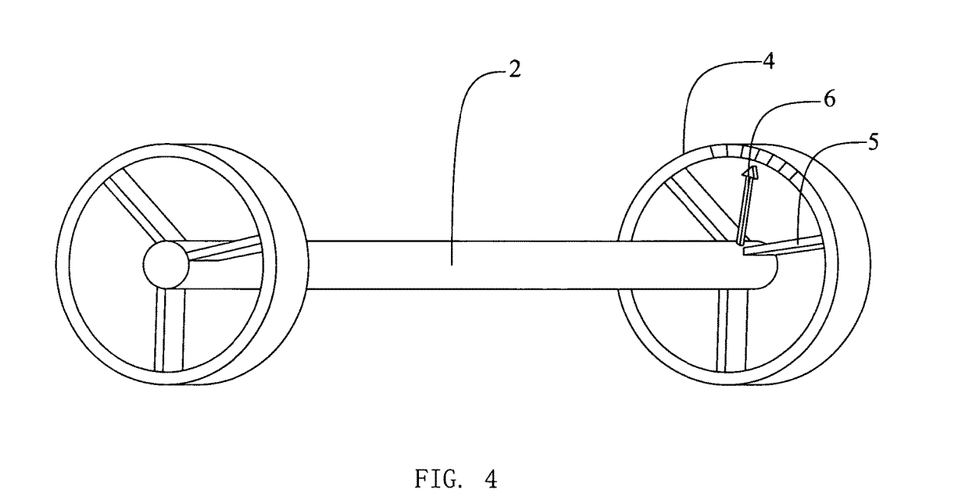
FIG. 4 is a structural diagram of the winding member according to the first embodiment.

As long as the flexible portion of the body 1 can be wound around the winding member 2, the detailed structure of the winding member 2 is not specified. Preferably, as shown in FIG. 4, the winding member 2 is a cylinder for conveniently winding the body 1. The winding member 2 and the body 1 may be set separately, or fixed together with each other.

Figure 2:
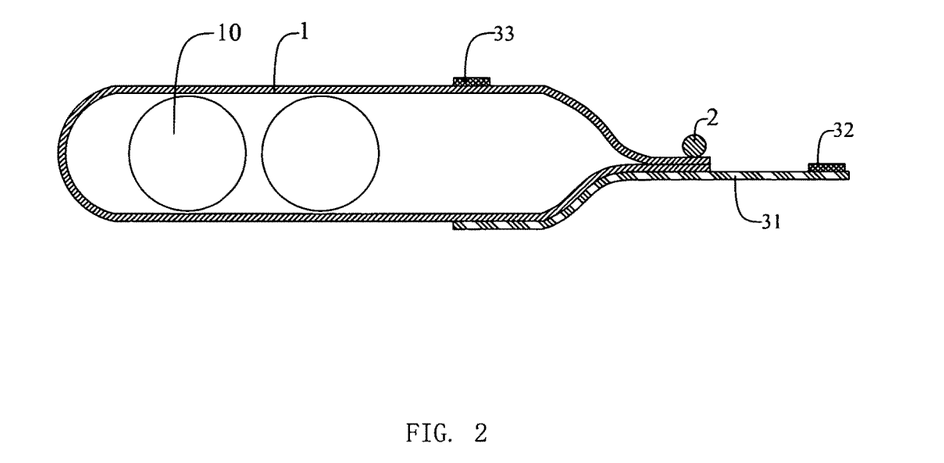
FIG. 2 is a cross-sectional view along A-A in FIG. 1.
Figure 3:
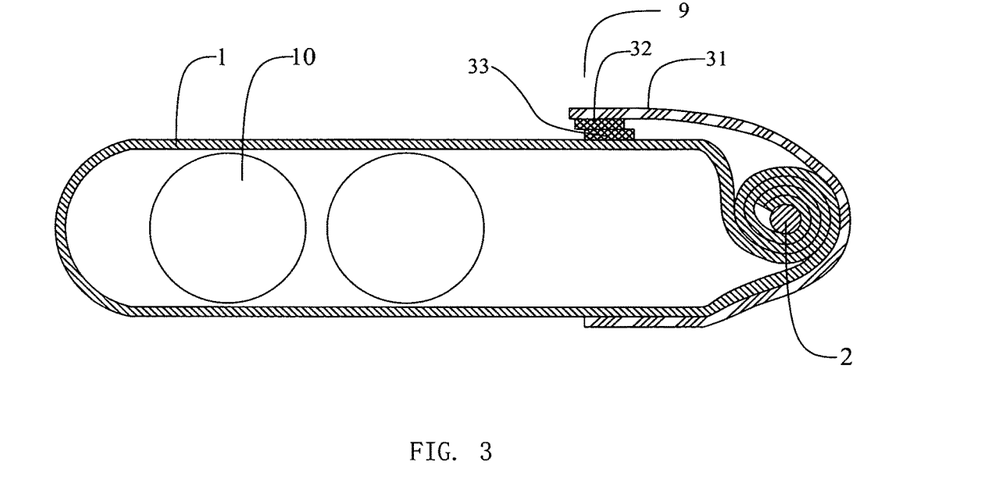
FIG. 3 is a structural diagram of the sealed pressure container shown in FIG. 2 after being wound.

Further, the sealed pressure container includes a securing member for securing a first portion of the body that has been wound. The detailed structure of the securing member is not specified, as long as it can fix the winding portion to maintain the internal pressure of the body 1. For example, as shown in FIGS. 1 to 3, the securing member includes a fastener 9 for securing the winding portion and non-winding of the body together.

Specifically, the fastener 9 includes a buckle tape 31, a first buckle member 32 and a second buckle member 33. One end of the buckle tape 31 is secured on the body 1, the other end of the buckle tape has the first buckle member 32, and the second buckle member 33 is secured on the body 1. As shown in FIG. 3, the first buckle member 32 and the second buckle member 33 are fixed together with each other after the buckle tape 31 has been wound around the non-winding portion and a first portion of the body that has been wound 1 successively.

Further, the sealed pressure container includes a pressure gauge for indicating the internal pressure of the body 1. In a preferable embodiment, the pressure gauge includes at least one rigid handle 4, a flexible arm 5 and a pointer 6. At least one rigid handle 4 has a scale for indicating the internal pressure of the body 1. The flexible arm 5 has one end being connected with the rigid handle 4 and the other end being connected with the winding member 2. The pointer 6 has one end connected with the winding member 2 and the other end pointing to the scale of the rigid handle 4. The winding member 2 is rotated by rotating the rigid handle 4 so that the body 1 can be wound around the winding member 2. The flexible arm 5 is deformed by force so that the rigid handle 4 is deflected with respect to the pointer 6. The greater the internal pressure of the body 1, the bigger the deflection will be. Thus, the scale for indicating the internal pressure of the body 1 can be obtained by calibration. A first portion of the body that has been wound 1 can be fixed by the securing member when the pointer 6 indicates that the internal pressure meet the requirement.

Figure 5:
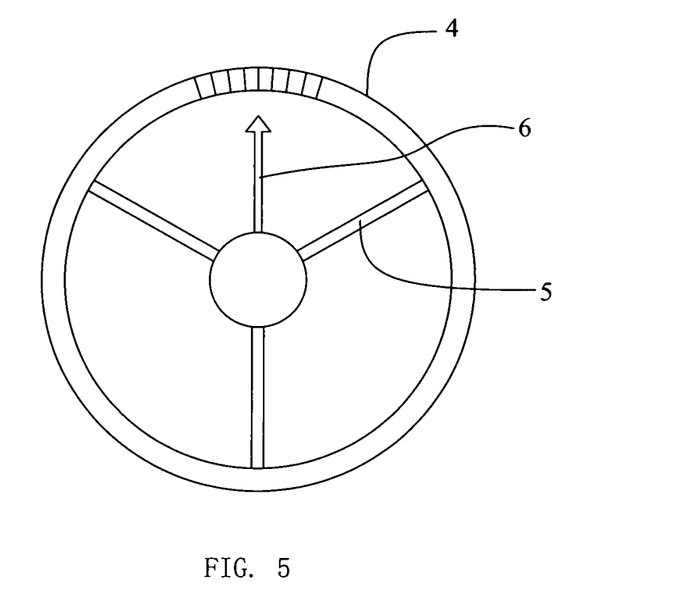
FIG. 5 is a state diagram of the pressure gauge of the example sealed pressure container according to a first embodiment before being wound.
Figure 6:
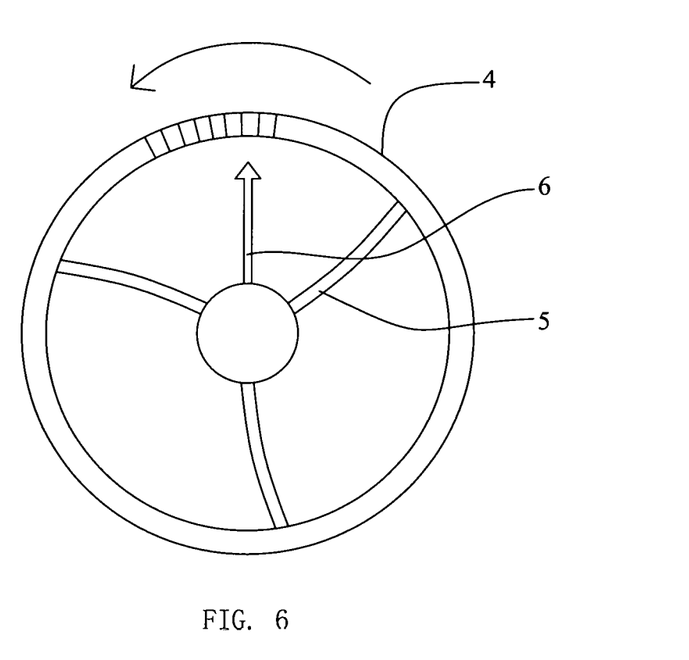
FIG. 6 is a state diagram of the pressure gauge of the example sealed pressure container according to a first embodiment after being wound.

In order to improve the convenience of operation, two rigid handles 4 are sleeved on both ends of the winding member 2 respectively. As shown in FIG. 5, three flexible arms 5 are uniformly arranged at the outer periphery of the winding member 2 in circumferential direction. As shown in FIG. 6, the winding member 2 is rotated by rotating the rigid handle 4, the flexible arms 5 are deformed due to the action of the moment, and the rigid handles 4 is deflected with respect to the pointer 6, so the present internal pressure of the body 1 is indicated by the pointer 6.

Thus, the sealed pressure container according to the first embodiment is used as follows. Put the tennis ball 10 into the body 1 through the open end, and then wind the open end of the body 1 around the winding member 2. Rotate the rigid handle 4 for winding the winding member 1. When the pointer 6 indicates that the present internal pressure of the body 1 meets the requirement, fix a first portion of the body that has been wound by the fastener.

Second Embodiment

The sealed pressure container according to the second embodiment is substantially the same as that according to the first embodiment. The difference between them is that a sealing structure is arranged at the open end of the body 1 according to the second embodiment, in order to open and close the open end. The sealing structure further improves the sealing performance of the sealed pressure container.

Figure 7:
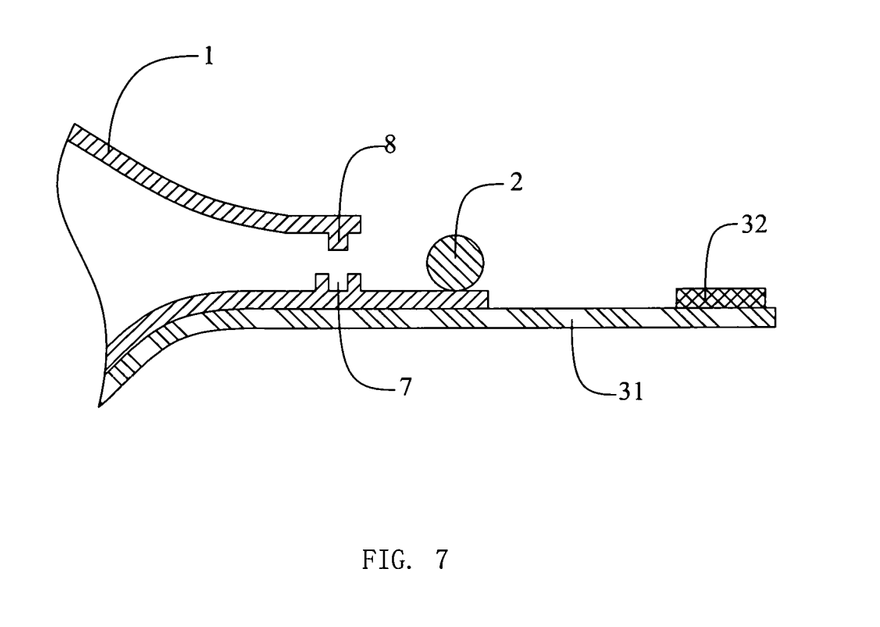
FIG. 7 is a structural diagram of the body with the open end open of the example sealed pressure container according to a second embodiment.
Figure 8:
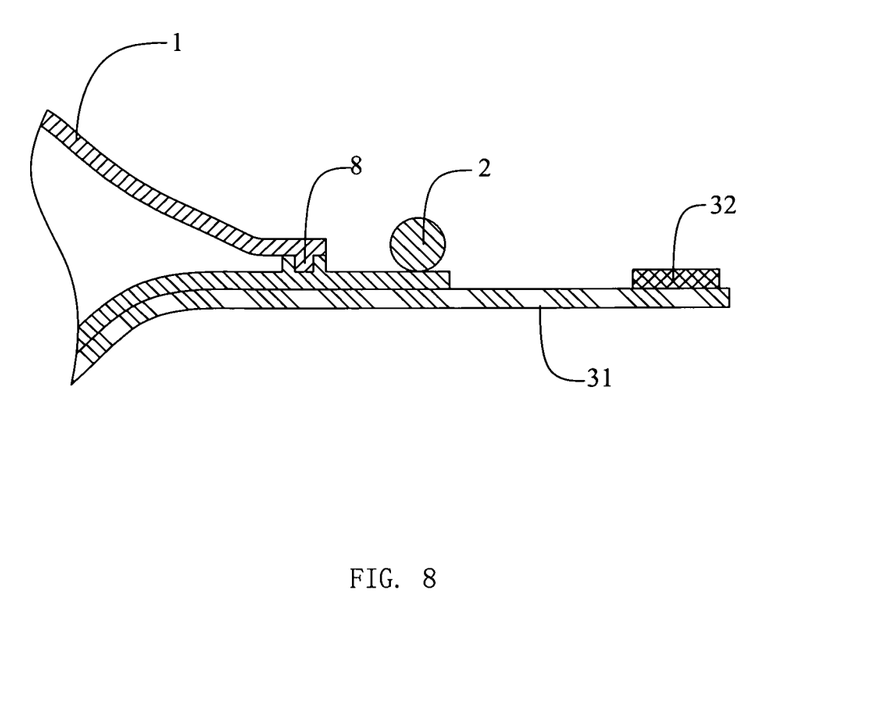
FIG. 8 is a structural diagram of the body with the open end closed of the example sealed pressure container according to a second embodiment.

The structure of the sealing structure is not specified, as long as the open end can be easily opened and closed. For example, the structure of the sealing structure may be a bonding structure, a clamped structure, a plugging structure or other kind of structures. Preferably, as shown in FIG. 7 and FIG. 8, a strip groove 7 is provided on one side of the open end and a sealing strip 8 is provided on the other side of the open end, so that the open end of the body can be closed by plugging the sealing strip 8 into the strip groove 7.

Third Embodiment

The sealed pressure container according to the third embodiment is substantially the same as that according to the second embodiment. The difference between them is that the winding member 2 of the sealed pressure container according to the third embodiment is detachably connected with the body 1, thereby providing sufficient space for putting the tennis balls 10.

Figure 9:
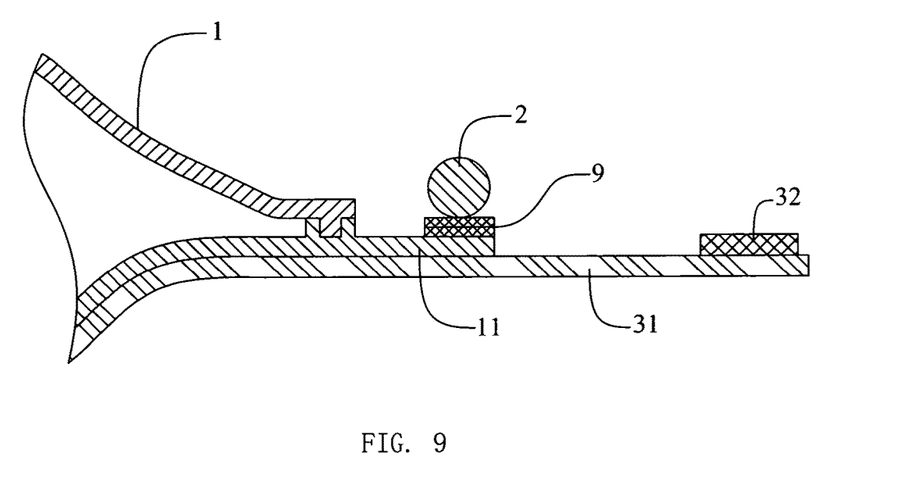
FIG. 9 is a structural diagram of the body without the open end having been wound of the example sealed pressure container according to a third embodiment.

The connection manner between the winding member 2 and the body 1 is not specified, as long as the winding member 2 can be easily connected and disconnected to the body 1. In a preferable embodiment, as shown in FIG. 9, a connection portion 11 is protruded at the open end of the body 1, so that the winding member 2 can be secured on the connection portion 11 by the fastener 9.

Fourth Embodiment

Figure 10:
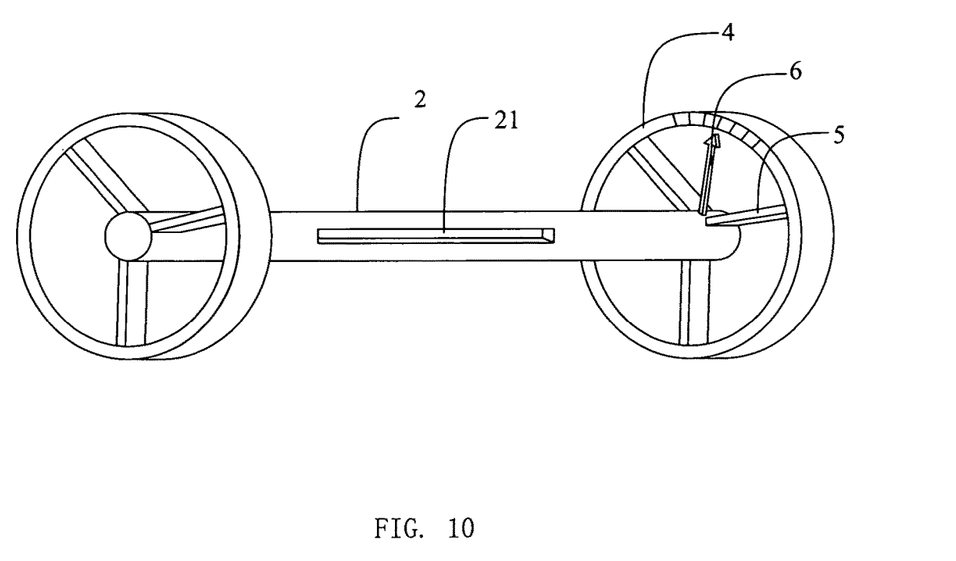
FIG. 10 is a structural diagram of the winding member of the example sealed pressure container according to a fourth embodiment.

The sealed pressure container according to the fourth embodiment is substantially the same as that according to the first embodiment. As shown in FIG. 10, the difference between them is that the winding member 2 and the body 1 are provided separately from each other, and the through hole 21 is provided on the winding member 2, the open end of the body 1 extends through the through hole 21, and subsequently, the winding process and the securing process are performed.

Fifth Embodiment

Figure 11:
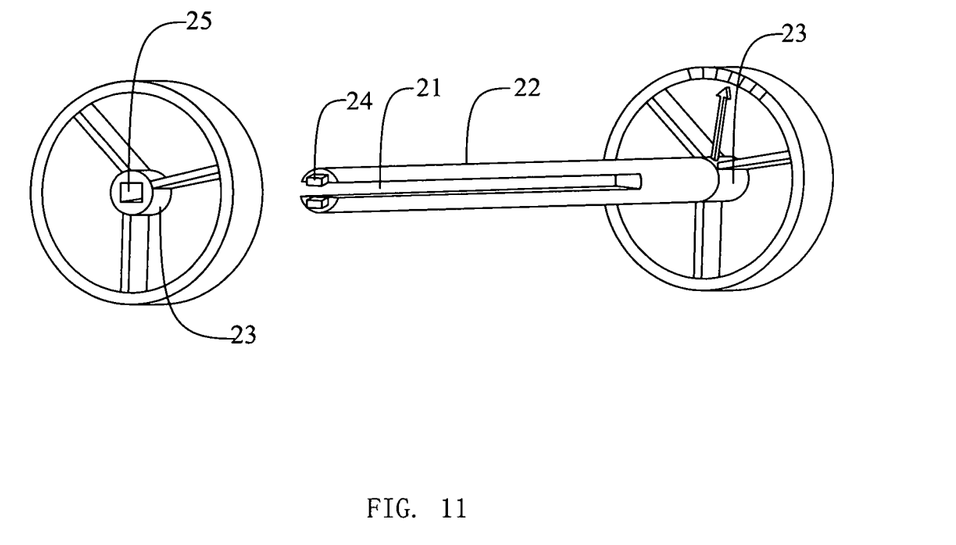
FIG. 11 is an explosive view of the winding member of the example sealed pressure container according to a fifth embodiment.
Figure 12:
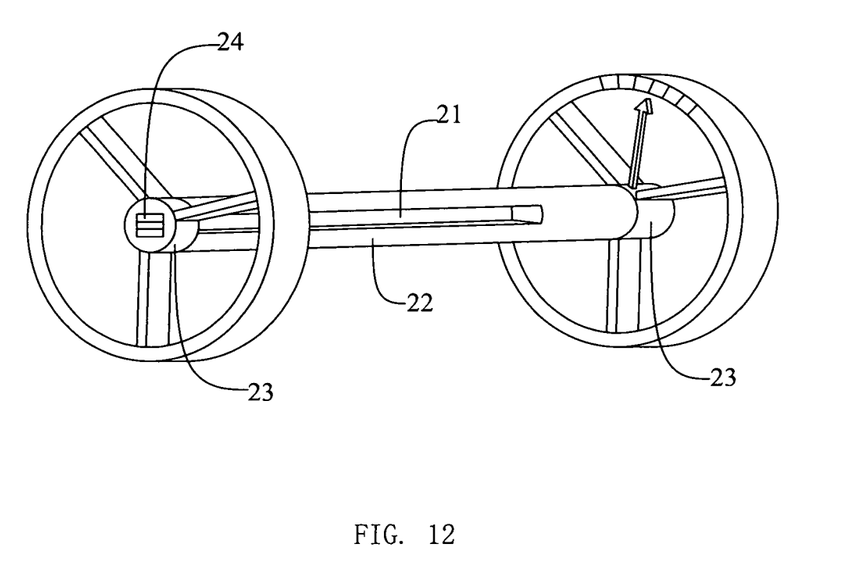
FIG. 12 is an assembly diagram of the winding member of the example sealed pressure container according to a fifth embodiment.
Figure 13:
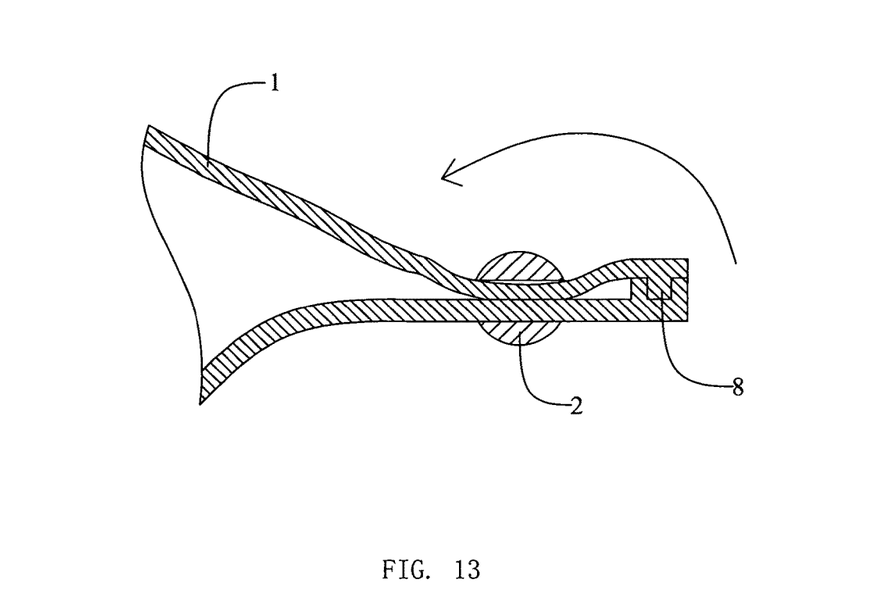
FIG. 13 is a structural diagram which shows the cooperation between the winding member and the open end of the body of the example sealed pressure container according to a fifth embodiment.

The sealed pressure container according to the fifth embodiment is substantially the same as that according to the fourth embodiment. As shown in FIG. 11, the difference between them is that the structure of the winding member is designed to be a three-stage structure, which including an intermediate first section 22 and a second section provided on both ends of the first section 22, and a pressure gauge is provided on the second section 23, herein the first section 22 and the second section 23 are connected detachably, thus the problem that the sealing structure of the open end of the body 1 cannot pass through the through hole 21 when the size of the sealing structure is too large can be solved. For example, as shown in FIG. 11, a bump 24 is provided at the end of the first section 22, a jack 25 is provided on the second section 23. The bump 24 is plugged into the jack 25 so that the first section 22 and the second section 23 can be connected with each other, as shown in FIG. 12. A through hole 21 is provided on the first section 22, and one end of the through hole 21 extends to the side surface of the first section 22, that means a notch is formed on the first section 22.

As shown in FIG. 1, when using the sealed pressure container, insert the body 1 into the through hole 21 from the open end of the through hole 21 of the first section 22, then connect the first section 22 and the second section 23 together, and subsequently perform the winding process and the securing process.

Sixth Embodiment

Figure 14:
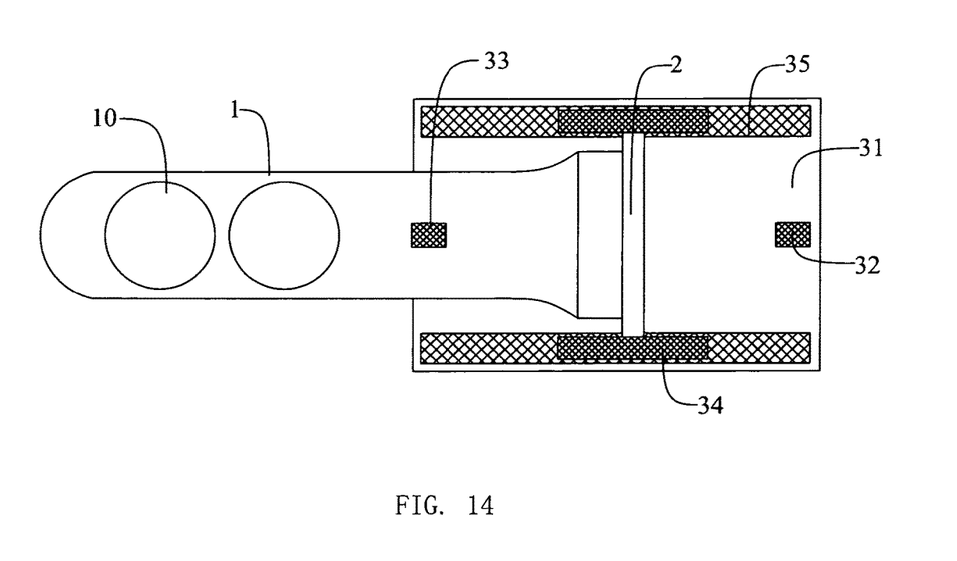
FIG. 14 is a plan view of the example sealed pressure container before being wound according to a sixth embodiment.

The sealed pressure container according to the sixth embodiment is substantially the same as that according to the first embodiment. As shown in FIG. 14, the difference between them is that the fastener in the sixth embodiment includes a buckle tape 31, a first buckle member 32, a second buckle member 33, a third buckle member 34 and a fourth buckle member 35.

Figure 15:
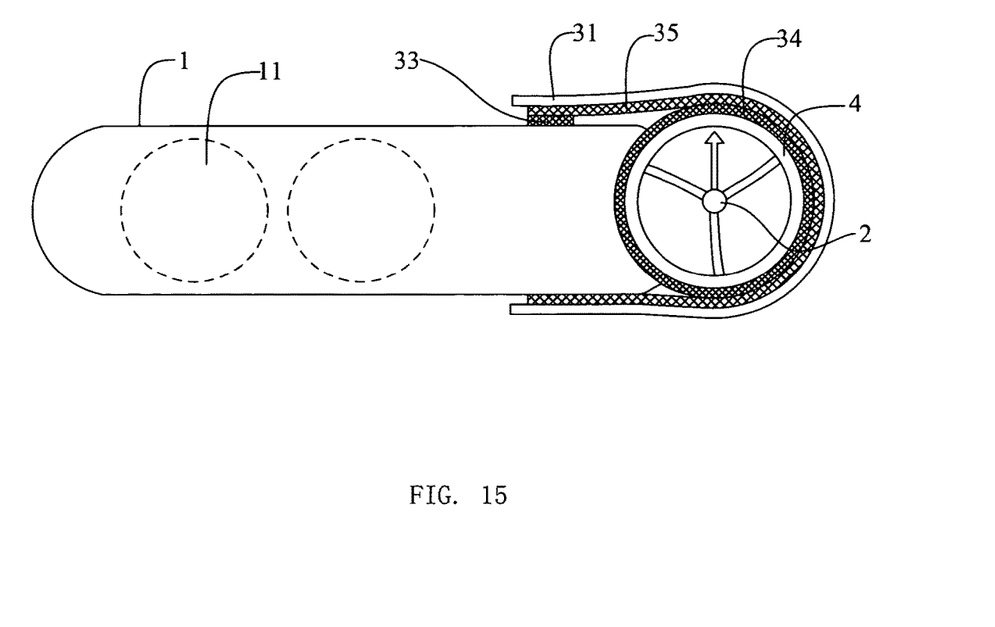
FIG. 15 is a main view of the example sealed pressure container after being wound according to a sixth embodiment.

Specifically, similar with the structure of the sealed pressure container according to the first embodiment, one end of the buckle tape 31 is secured on the body 1 and the other end of the buckle tape is secured on the first buckle member 32. The second buckle member 33 is secured on the body 1. The difference is that the buckle tape 31 is large in width, which is able to surround the entire rigid handle 4 at the both ends of the winding member 2. The third buckle member 34 is provided on the rigid handle 4, for example, it can surround the entire outer periphery of the rigid handle 4. The fourth buckle member 35 is provided on the buckle tape 31, corresponding to the location of the third buckle member 34. The first buckle member 32 and the second buckle member 33 are fixed by bonding connection after the buckle tape 31 is wound successively around the non-winding portion and a first portion of the body that has been wound 1. The fourth buckle member 35 and the third buckle member 34 are also fixed by bonding connection, as shown in FIG. 15. Such structure provides good fixation of the rigid handle 4, thereby further improving the reliability of the sealed pressure container.

It will be surely understood that the sealed pressure container according to the invention is not limited to the storage of tennis balls, but can also store other articles that need to be kept under pressure.

Furthermore, it will be understood by one skilled in the art that attached drawings are to be regarded as illustrative, and may not be drawn to scale.

It should be understood that these embodiments are provided so that this disclosure will be thorough and complete, and will fully convey the scope of the invention to those skilled in the art. Numerous specific details such as particular components, devices and methods are merely provided to assist the overall understanding of example embodiments of the present invention. One skilled person will understand the example embodiments may be performed in many different forms without resorting to specific details, and that example embodiments should not be construed as limiting the scope of the present disclosure. In some example embodiments, well known device structures and well known technologies have not been described in detail.

When an element or layer is referred to as being "on", "bonded to", "connected to" or "coupled" to another element or layer, it may be directly bonded on, connected to, or coupled to the other element or layer; or there are intermediate element or layer between them. In contrast, when an element is referred to as being directly on, directly bonded to, directly connected to, or directly coupled to another element or another layer, there are no intermediate element or layer present. Other terms used to describe the relationship between elements should be interpreted in a similar manner (e.g., between and directly between; adjacent and direct adjacent). As used herein, the term "and/or" includes any or all combinations of one or more of the associated listed items.

Although the terms first, second, third, etc., may be used herein to describe various elements, components, regions, layers and/or sections, such elements, components, regions, layers and/or sections should not be limited by these terms. These terms are only used to distinguish one element, component, region, layer, or section from another element, component, region, layer, or section. Moreover, unless specifically stated any use of the terms first, second and other numerical terms, do not denote any order or sequence. Thus, a first element, component, region, layer or section discussed below could be termed a second element, component, region, layer or section without departing from the teachings of the example embodiments. The term "plurality", as used herein, is defined as two or more than two, unless something otherwise is specifically stated.

The foregoing descriptions of specific embodiments of the present invention have been presented, but are not intended to limit the invention to the precise forms disclosed. It will be readily apparent to one skilled in the art that many modifications and changes may be made in the present invention. Any modifications, equivalence, variations of the preferred embodiments can be made without departing from the doctrine and spirit of the present invention.

What is claimed is:

1. A sealed pressure container, comprising;
   a body having an open end and a flexible portion at least at one side where the open end is formed;
   a winding member; and
   a pressure gauge for indicating pressure in the body,
   wherein the flexible portion of the body is used to be wound around the winding member from the open end of the body to compress air in the body for providing air pressure in the body,
   the pressure gauge comprises at least one rigid handle having a scale for indicating the pressure in the body, a flexible arm having one end being connected with the rigid handle and the other end being connected with the winding member, and a pointer having one end connected with the winding member and the other end pointing to the scale of the rigid handle.

2. The sealed pressure container according to claim 1, further comprising a fastener for securing a first portion of the body that has been wound on a second portion of the body that has not been wound.

3. The sealed pressure container according to claim 2, wherein the fastener comprises a buckle tape, a first buckle member and a second buckle member,
   one end of the buckle tape is secured on the body, and the other end of the buckle tape has the first buckle member,
   the second buckle member is secured on the body, and
   the first buckle member and the second buckle member are adhered to each other after the buckle tape is wound successively around the first portion and the second portion of the body.

4. The sealed pressure container according to claim 1, wherein the rigid handle has an annular shape and surrounds the winding member.

5. The sealed pressure container according to claim 1, wherein the pressure gauge comprises two rigid handles which are respectively arranged on two ends of the winding member.

6. The sealed pressure container according claim 2,
   wherein the fastener comprises a buckle tape, a first buckle member, a second buckle member, a third buckle member and a fourth buckle member;
   one end of the buckle tape is secured on the body, and the other end of the buckle tape has the first buckle member;
   the second buckle member is secured on the body;
   the third buckle member is secured on the rigid handle;
   the fourth buckle member is provided on the buckle tape, corresponding to location of the third buckle member;
   the first buckle member and the second buckle member are adhered to each other and the fourth buckle member and the third buckle member are adhered to each other after the buckle tape is wound successively around the non-winding and winding portions of the body.

7. The sealed pressure container according to claim 1, wherein a sealing member is provided on the open end of the body for opening or closing the open end.

8. The sealed pressure container according to claim 1, wherein
the winding member is detachably connected to the body.

9. The sealed pressure container according to claim 8, wherein a connection portion protrudes from one side of the open end of the body and the winding member is detachably arranged on the connection portion; or
the winding member has a through hole, and the open end of the body extends through the through hole.

10. The sealed pressure container according to claim 9, wherein the winding member comprises a first section and a second section on the end of the first section, the first section having a through hole with one end extending to a side surface of the first section.

* * * * *